(12) United States Patent
Michaud et al.

(10) Patent No.: US 11,060,740 B2
(45) Date of Patent: Jul. 13, 2021

(54) AIR DISTRIBUTION SYSTEM

(71) Applicants: Bertrand Michaud, Quebec (CA);
Christian Philippe Vézina, Quebec (CA)

(72) Inventors: Bertrand Michaud, Quebec (CA);
Christian Philippe Vézina, Quebec (CA)

(*) Notice: Subject to any disclaimer, the term of this patent is extended or adjusted under 35 U.S.C. 154(b) by 988 days.

(21) Appl. No.: 15/489,165

(22) Filed: Apr. 17, 2017

(65) Prior Publication Data

US 2017/0299205 A1 Oct. 19, 2017

Related U.S. Application Data

(60) Provisional application No. 62/323,896, filed on Apr. 18, 2016.

(51) Int. Cl.
*F24F 3/052* (2006.01)
*F24F 11/74* (2018.01)
*F24F 3/06* (2006.01)

(52) U.S. Cl.
CPC .............. *F24F 3/052* (2013.01); *F24F 3/065* (2013.01); *F24F 11/74* (2018.01)

(58) Field of Classification Search
CPC . F24F 3/052; F24F 3/065; F24F 11/74; F25B 2313/009; F25B 2313/0231
USPC ............................................ 454/236; 62/210
See application file for complete search history.

(56) References Cited

U.S. PATENT DOCUMENTS

| | | | | | |
|---|---|---|---|---|---|
| 3,521,700 | A | * | 7/1970 | Knowles | F24D 5/12 165/216 |
| 4,106,307 | A | * | 8/1978 | Matsuda | F24F 3/001 62/324.4 |
| 4,646,538 | A | * | 3/1987 | Blackshaw | F25B 41/20 62/238.7 |
| 2003/0085033 | A1 | * | 5/2003 | Petterson | F24F 3/0444 165/214 |
| 2007/0087681 | A1 | * | 4/2007 | Cook | F24F 11/30 454/256 |
| 2009/0255997 | A1 | * | 10/2009 | Goldmann | F24F 12/003 236/1 B |
| 2010/0037641 | A1 | * | 2/2010 | Kasahara | F25B 9/008 62/210 |
| 2018/0347868 | A1 | * | 12/2018 | Okano | F25B 13/00 |
| 2019/0011154 | A1 | * | 1/2019 | Takizawa | F25B 1/10 |

* cited by examiner

*Primary Examiner* — Steven B Mcallister
*Assistant Examiner* — Charles R Brawner
(74) *Attorney, Agent, or Firm* — Servilla Whitney LLC

(57) ABSTRACT

The present disclosure provides an air distribution system comprised of a central unit connected to a ventilation system and a control system. The central unit is responsible for re-directing ambient air through an evaporator and condenser coil in order to heat and cool said air and separately distribute it through the ventilation system. A control system is connected to the ventilation system, which allows for either hot or cool air that is compartmented in the ventilation system to be distributed in the rooms. By doing so, the air distribution system is able to manage the various demands for simultaneous hot and cold air demands.

8 Claims, 19 Drawing Sheets

AIR DISTRIBUTION SYSTEM

CROSS-REFERENCE TO RELATED APPLICATIONS

This application claims priority to U.S. Provisional Application No. 62/323,896, filed Apr. 18, 2016, the entire disclosure of which is hereby incorporated by reference herein.

FIELD

The disclosure relates to the field of heating, ventilation and air conditioning distribution systems, and more specifically to a system for simultaneous cold and hot air creation and distribution.

SUMMARY

In an aspect, the present disclosure provides an air distribution system comprising a ventilation conduit system positioned within a dwelling to carry air throughout the dwelling and a central unit connected to the ventilation conduit system to receive stale air from the dwelling and expel hot and cold air separately to the ventilation conduit system. The system also comprises an exterior exchange coil operatively engaged to the central unit to provide additional cooling and additional heating to the dwelling and, a control system engaged to the ventilation conduit system to control the flow of the air into specific rooms of the dwelling wherein the ventilation conduit system receives the hot air isolated from the cold air and combines the hot air and the cold air for distribution into the rooms.

In another aspect, the present disclosure provides for a method to generate hot and cold air using an air distribution system.

BRIEF DESCRIPTION OF THE DRAWINGS

The following figures serve to illustrate various embodiments of features of the disclosure. These figures are illustrative and are not intended to be limiting.

DETAILED DESCRIPTION OF THE DRAWINGS

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

The terms "warm" and "hot" or "cool" and "cold", along with their derivatives, may be used herein. It should be understood that these terms are intended to be synonyms for each other. In other words, the terms "warm" and "hot" can be used interchangeably, as can the words "cold" and "cool". Further, whenever the terms cold or cool are used in conjunction with the term liquid, it is understood that the terms cold or cool are relative and not necessarily indicative of an inherently cold nature of the liquid. Simply put, a liquid is cool or cold in liquid form, as opposed to a cold or hot gas which is affected by its pressure.

Figure 1:
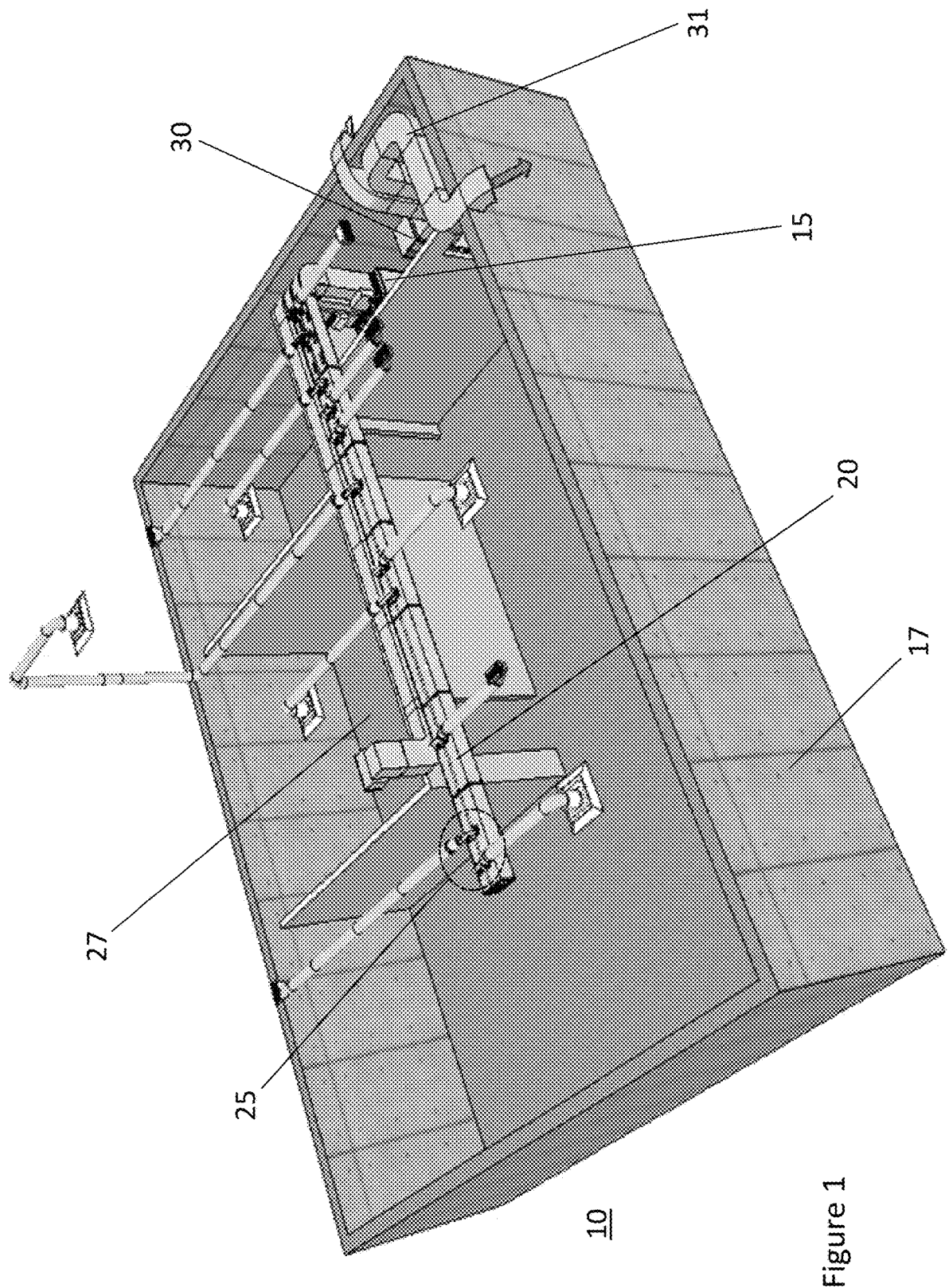
FIG. 1 is a perspective view of an air distribution system within a building, according to an embodiment of the present disclosure.

With reference to FIG. 1 and according to a first embodiment of the present disclosure, an air distribution unit 10 is shown, generally comprised of a central unit 15 providing a source or flow of simultaneously hot and cold air throughout a building 17, a ventilation system 20 which is connected to the central unit 15 to separately displace the hot and cold air created by said central unit 15, and a control system 25 connected to the ventilation system 20 in order to divert the hot and cold air into specific rooms 27, based on a user's personal preferences. An exterior exchange coil 30 is also shown, operatively engaged with the central unit 15 in such a way so that when the rooms 27 are particularly demanding with either hot or cold air, said central unit 15 can rely on the exterior exchange coil 30 for additional heat exchange. Indeed, the exterior exchange coil 30 is connected to exterior ventilation ducts 31 in order to expel surplus of hot or cold air, depending on the circumstances. A worker skilled in the art would appreciate that while the exterior exchange coil 30 is presently illustrated inside the dwelling, said exterior exchange coil 30 could also be positioned outside the dwelling which would facilitate the circulation of air to and from outside. During operation of the air distribution unit 10, ambient air flowing through a return vent (not shown) will flow throughout the central unit 15, and be both heated and cooled. The central unit 15 will redirect the heated and cooled air separately into a first and second exit vent (not shown), and into the ventilation system 20. The ventilation system 20 keeps the heated and cooled air separate, and control systems 25 located for every room 27 of the building 17 are connected to said ventilation system 20 and will distribute the hot and cold air depending on circumstances and preferences. Ambient air accumulated in each room 27 will flow back into the return vent (not shown), and cyclically back into the central unit 15. This cyclical functioning will be further explained below.

Figure 2A:
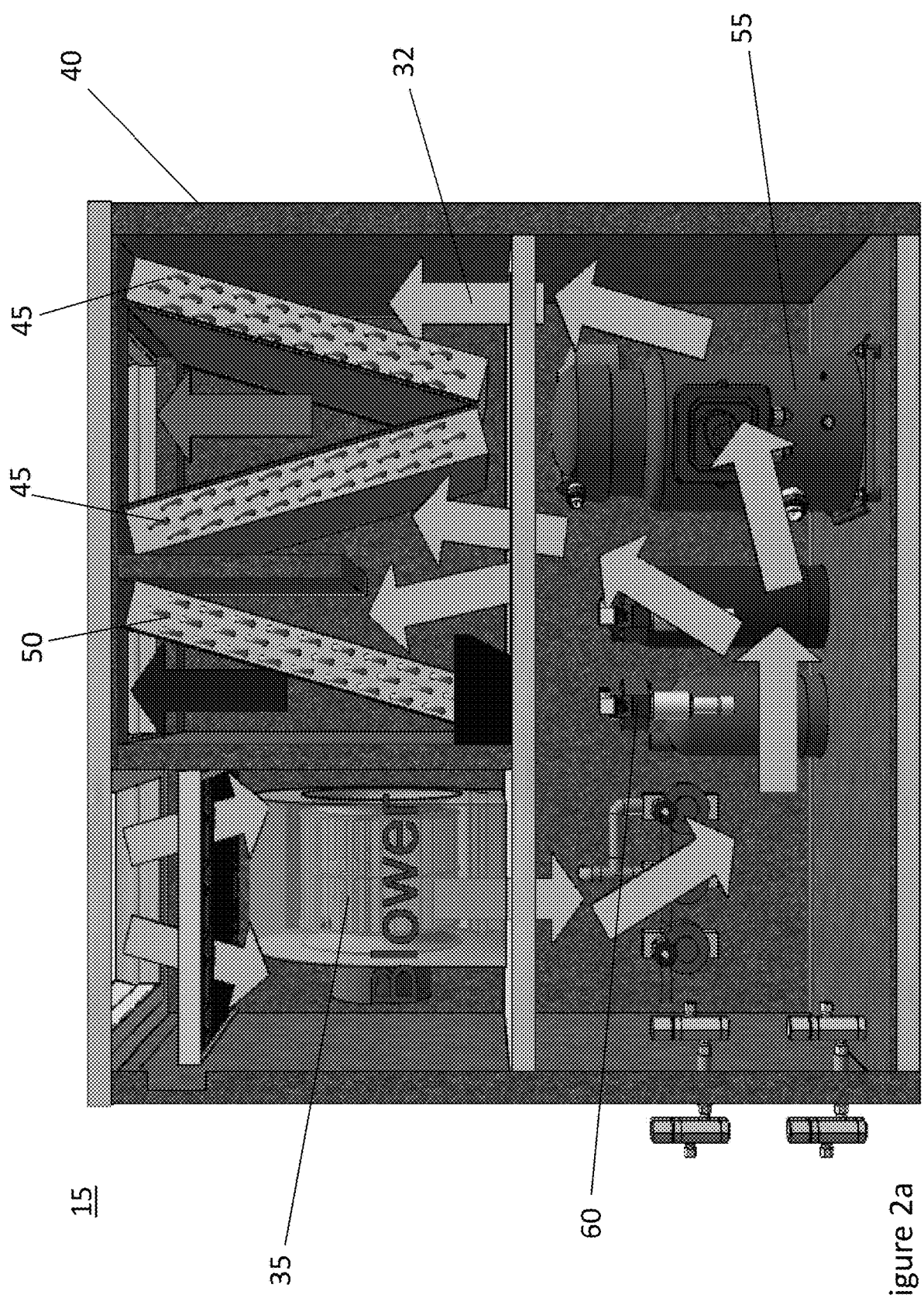
FIG. 2a is a front, partially cross-sectioned view of a central unit of an air distribution system according to an embodiment of the present disclosure.
Figure 2B:
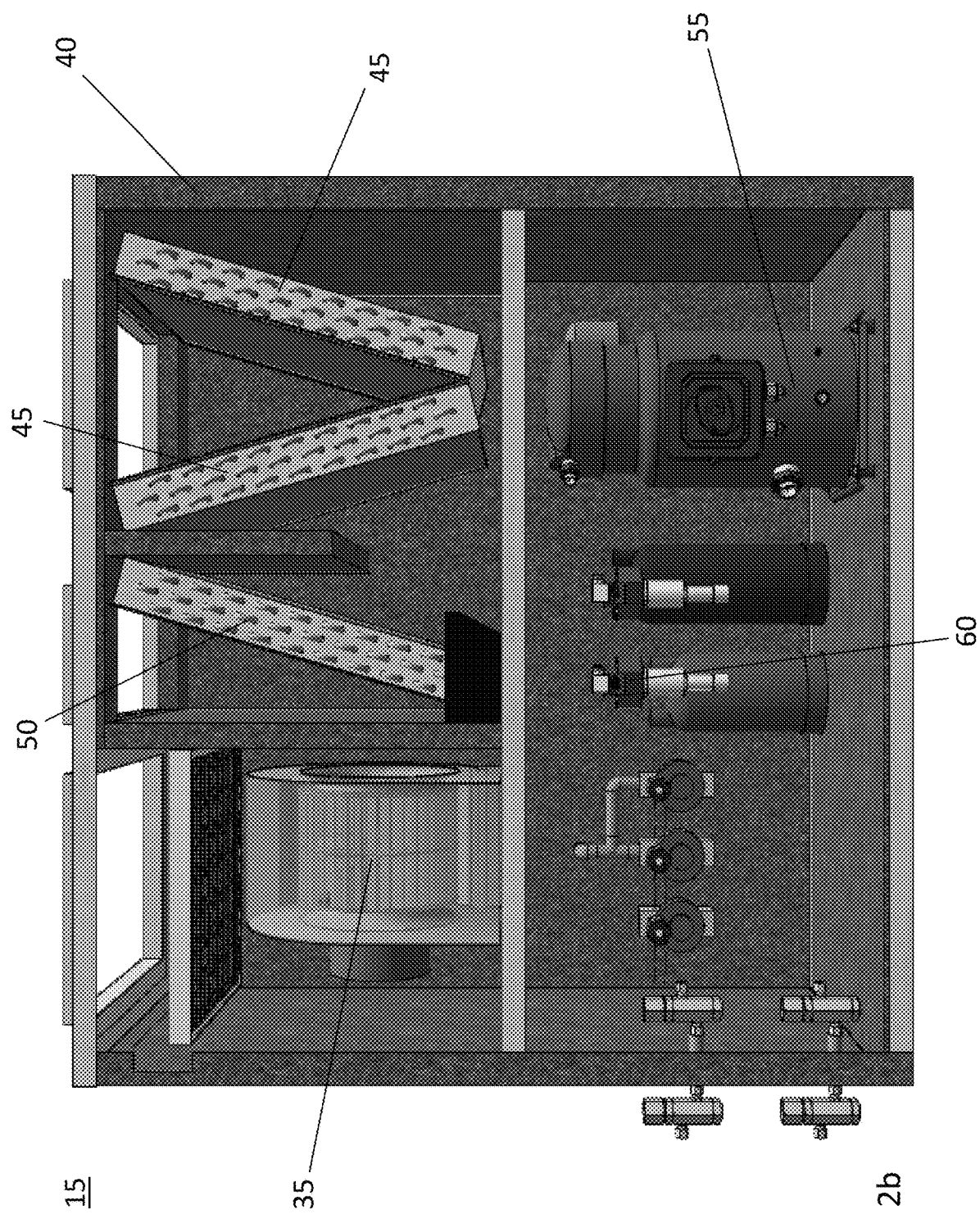
FIG. 2b is a front, partially cross-sectioned view of a central unit of an air distribution system according to an embodiment of the present disclosure.
Figure 3:
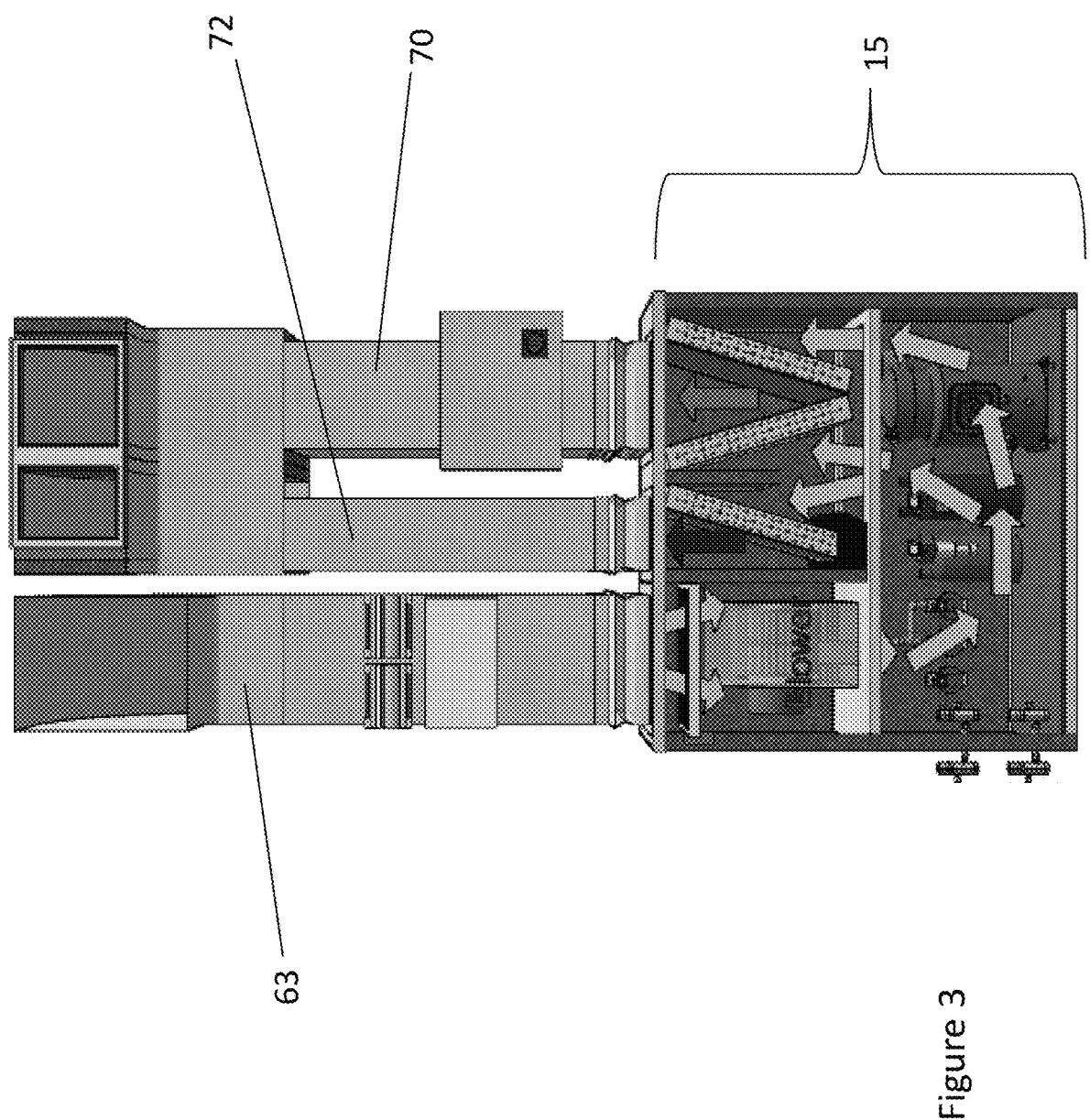
FIG. 3 is a front, partially cross-sectioned view of a central unit connected to a first and second exit vent and a return vent of an air distribution system according to an embodiment of the present disclosure.

With reference to FIGS. 2a, 2b and 3 and according to a first embodiment of the present disclosure, a central unit 15 is primarily responsible for redirecting air flow from a return vent 63 through to a first and second exit vent 70, 72. The arrows 32 represent said flow of air being directed through the housing 40 of the central unit 15. Once the circulated air arrives through the return vent 63, it makes its way into and out of the blower 35. Said blower 35 is known in the art, and is responsible for the suction of air from the return vent 63 which collects ambient air throughout the building, and expels said air throughout the housing 40 of the central unit 15. At least one condenser coil 45 and at least one evaporator coil 50 are fastened to the housing 40 of the central unit 15, which serve to generate heat or remove heat, respectively. In other words, the condenser coil 45 is responsible for generating heat, therefore as air flows through said condenser coil 45 it is sufficiently warmed for dispensing through a first exit vent 70. Meanwhile, the evaporator coil 50 is responsible for requiring heat, therefore removing it from ambient air and turning said air cool, before said cool air is dispensed through a second exit vent 72. The central unit 15 is further comprised of a compressor 55 and an expansion valve 60, which together along with the condenser coil 45 and evaporator coil 50 form a refrigeration cycle whereby a refrigerant changes state between from a liquid to a gas and then from a gas back to a liquid while travelling through the evaporator coil 50 and condenser coil 45, respectively. A worker skilled in the relevant art would appreciate the functioning of a standard refrigerant cycle; however, the novelty of its specific use in this particular embodiment will be further explained below. A worker skilled in the art would further appreciate that while only a single expansion valve 60 is shown herein, other expansion valves could be present, such as the ones shown in the circuit diagrams of FIGS. 5-9 and 13.

Figure 4:
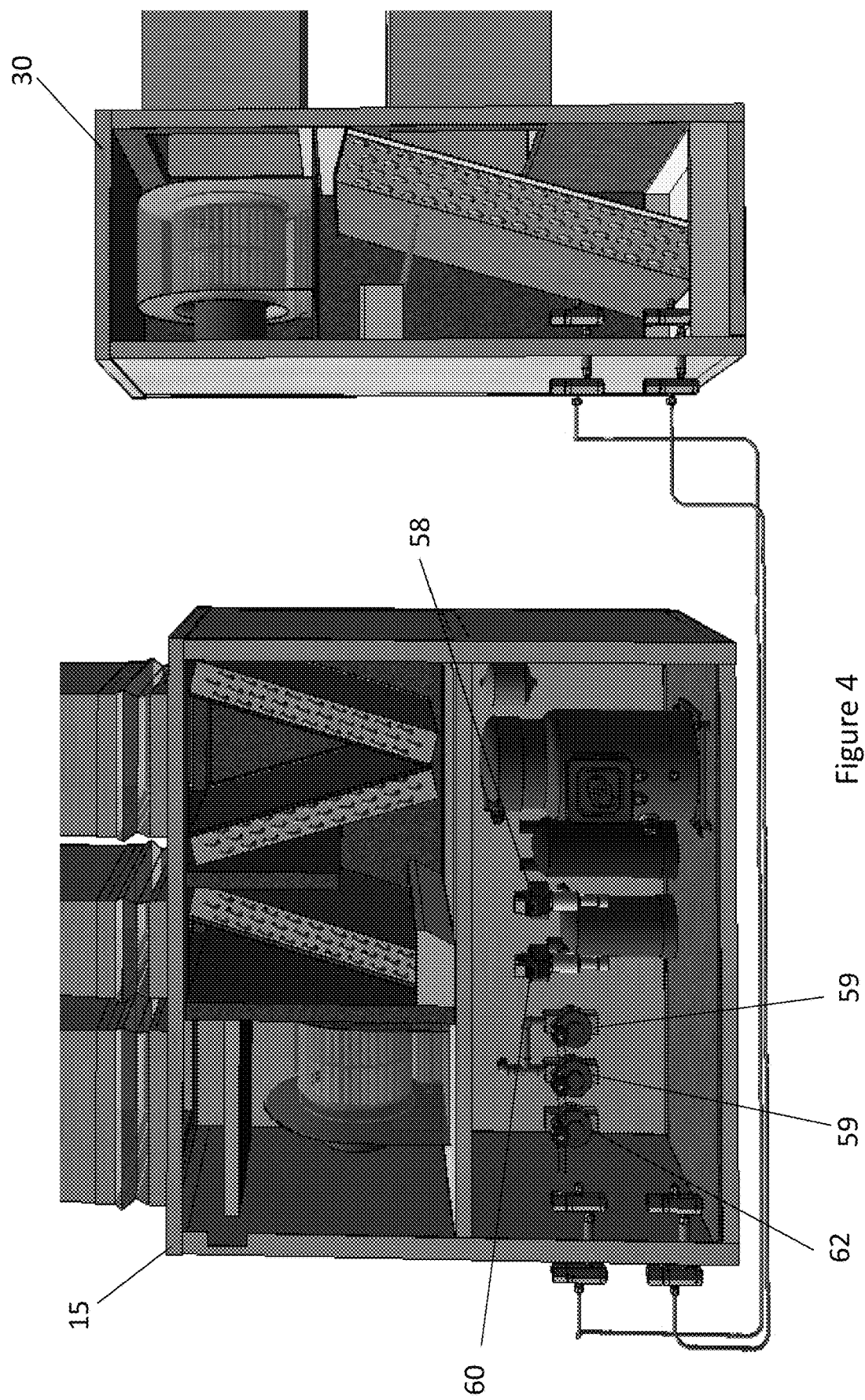
FIG. 4 is a front, partially cross-sectioned view of a central unit operatively engaged to an exterior exchange coil of an air distribution system according to an embodiment of the present disclosure.

With reference to FIG. 4 and according to a first embodiment of the present disclosure, the central unit 15 is shown physically operatively engaged with the exterior exchange coil 30 by means of connections between the expansion valve 60, a solenoid valve 62, an expansion valve 58 and solenoid valves 59 of the central unit 15 and the exterior exchange coil 30. The relationship between the exterior exchange coil 30 and the central unit 15 will be further described below in circuit form.

With reference to FIGS. 5, 6, 7, 8 and 9 and according to a first embodiment of the present disclosure, the evaporator coil 50 and the condenser coil 45 of the central unit 15 are shown operatively engaged to the exterior exchange coil 30 in circuit diagram form. The specific types of functioning under different operating conditions will be further described below.

Figure 5:
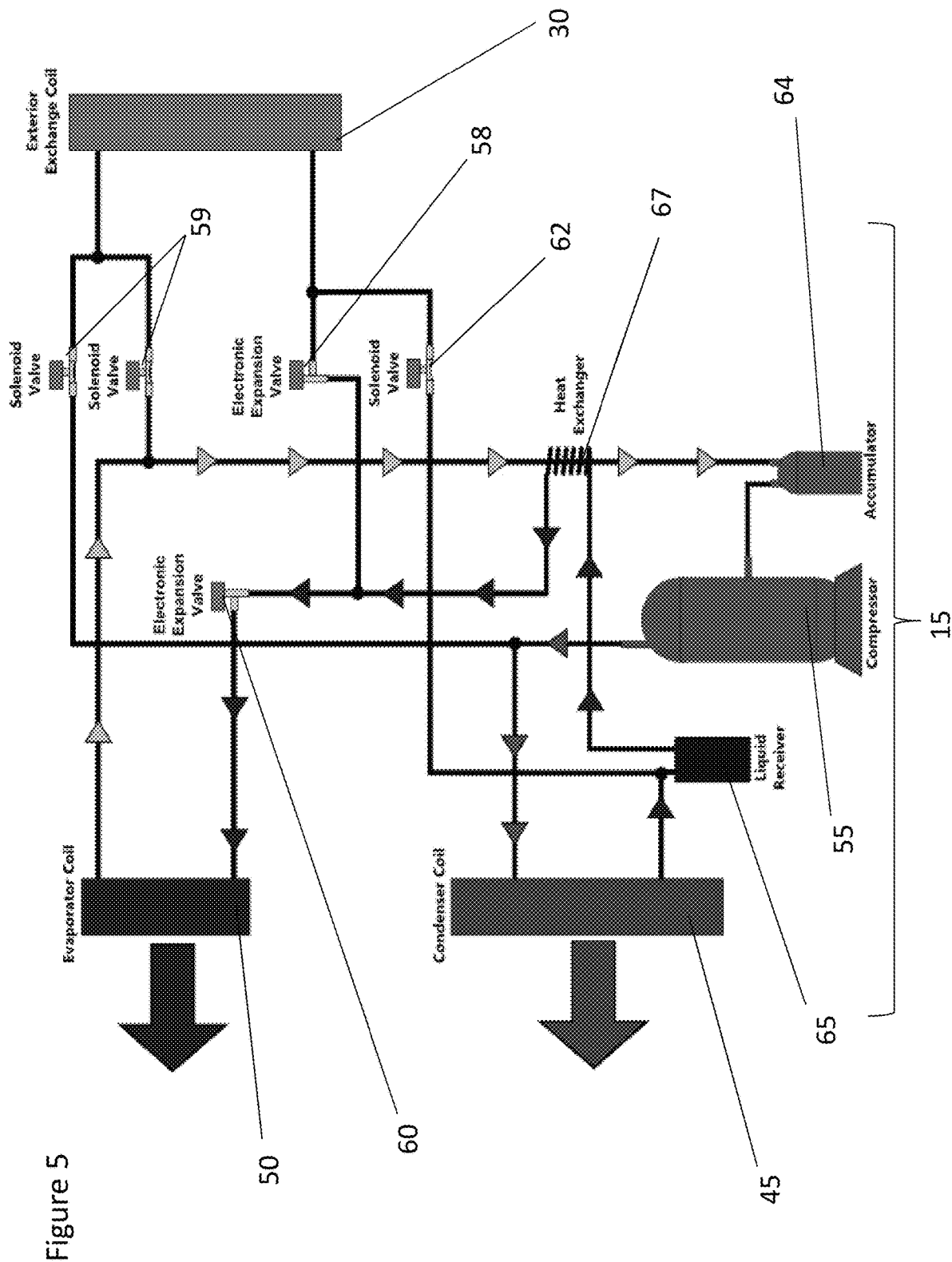
FIG. 5 is a first circuit diagram of the refrigeration cycle between a central unit and an exterior exchange coil of an air distribution system when the system is in equilibrium according to an embodiment of the present disclosure.

With specific reference to FIG. 5 and according to one embodiment of the present disclosure, the circuit diagram for the central unit 15 in connection to the exterior exchange coil 30 is shown. Specifically, this circuit represents a flow of air of the refrigeration cycle in equilibrium, as the demand in each room of hot versus cold air is approximately equal, such that there is no need from outside intervention by the exterior exchange coil 30. In other words, the refrigerant in the system will travel in gas form from an accumulator 64 which is well known in the art and responsible for storing cold gas refrigerant, into a compressor 55, which compresses the cold gas refrigerant, thereby creating a warm gas refrigerant which travels into the condenser coil 45. As the warm gas refrigerant loses its energy and is dispersed into air flowing through the condenser coil 45, it exits said condenser coil 45 in the form of cooler liquid. The cooler liquid refrigerant flows into a liquid receiver 65 where it is temporarily stored, especially when there is excess of cooled liquid refrigerant, before it travels through a heat exchanger 67. Said heat exchanger 67 is well-known in the art of thermodynamics and acts as a thermodynamic cycle regenerator: as the cooled liquid refrigerant travels through said heat exchanger 67, its warmer overall temperature will cause the cold gas refrigerant travelling in the other direction to become warmer. In other words, there is an energy exchange as the cooled liquid refrigerant will lose energy in the form of heat, which will be transferred to the cold gas refrigerant travelling in the opposite direction. This ensures a maximized heat transfer in the evaporator coil 50 as said evaporator coil 50 temperature is lower than it would be without the use of the heat exchanger 67. The use of a heat exchanger 67 in this particular position allows a better performance from the central unit 15, as the compressor 55 requires less power to compress the cold gas refrigerant, and thus the cycle efficiency is increased. 8

With further reference to FIG. 5, from the heat exchanger 67 the cool fluid refrigerant travels through an expansion valve 60 and into the evaporator coil 50, said evaporator coil 50 being well known in the art and allowing the cool liquid refrigerant to become gaseous. Therefore, as the cool liquid refrigerant gains energy, air flowing through the evaporator coil 50 is cooled and expelled out of a first exit vent (not shown). Meanwhile, the refrigerant exits said evaporator coil 50 in the form of a warmer, but still cool, gas. Said cooler gas passes through the heat exchanger and into the accumulator 64, whereby the process repeats itself. In this perfect equilibrium, no additional dissipation of hot or cold air is required as any hot or cold air created is recycled into the system perfectly.

Figure 6:
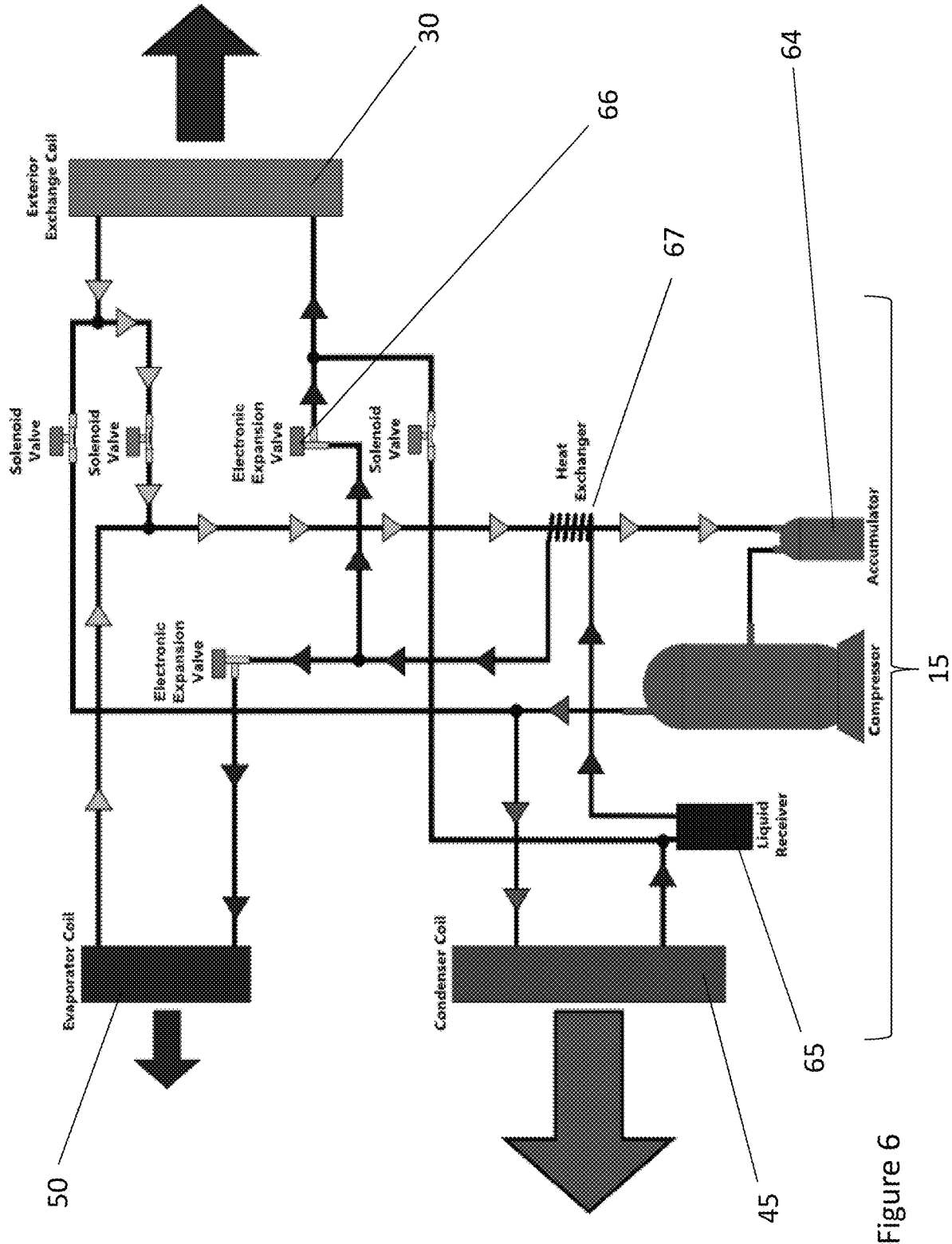
FIG. 6 is a second circuit diagram of the refrigeration cycle between a central unit and an exterior exchange coil of an air distribution system when there is additional demand for hot air according to an embodiment of the present disclosure.

With specific reference to FIG. 6 and according to one embodiment of the present disclosure, the circuit diagram for the central unit 15 in connection to the exterior exchange coil 30 is shown. Specifically, this circuit represents a flow of air whereby there is a simultaneous flow of hot and cold air; however, the rooms demand more heating than cooling. As such, the additional warm air required to satisfy the interior of the building will demand additional refrigerant to be sent through the condenser coil 45. Therefore, additional cool liquid will flow out of said condenser coil 45 and into the liquid receiver 65. Since the air distribution system 10 cannot send all of the excess cool liquid refrigerant to the evaporator coil 50 as this would create an overflow of liquid refrigerant returning to the compressor 55, said distribution system 10 must reroute the additional cool liquid through to a secondary expansion valve 66 and into the exterior exchange coil 30. Outside air flowing through the exterior exchange coil 30 will be cooled and expelled outdoors, and the refrigerant will gain energy as above and come out of the exterior exchange coil 30 as cooled gas. Said cooled gas will join the cooled gas flowing from the evaporator coil 50 and into the accumulator 64 whereby the process as described above will occur again.

Figure 7:
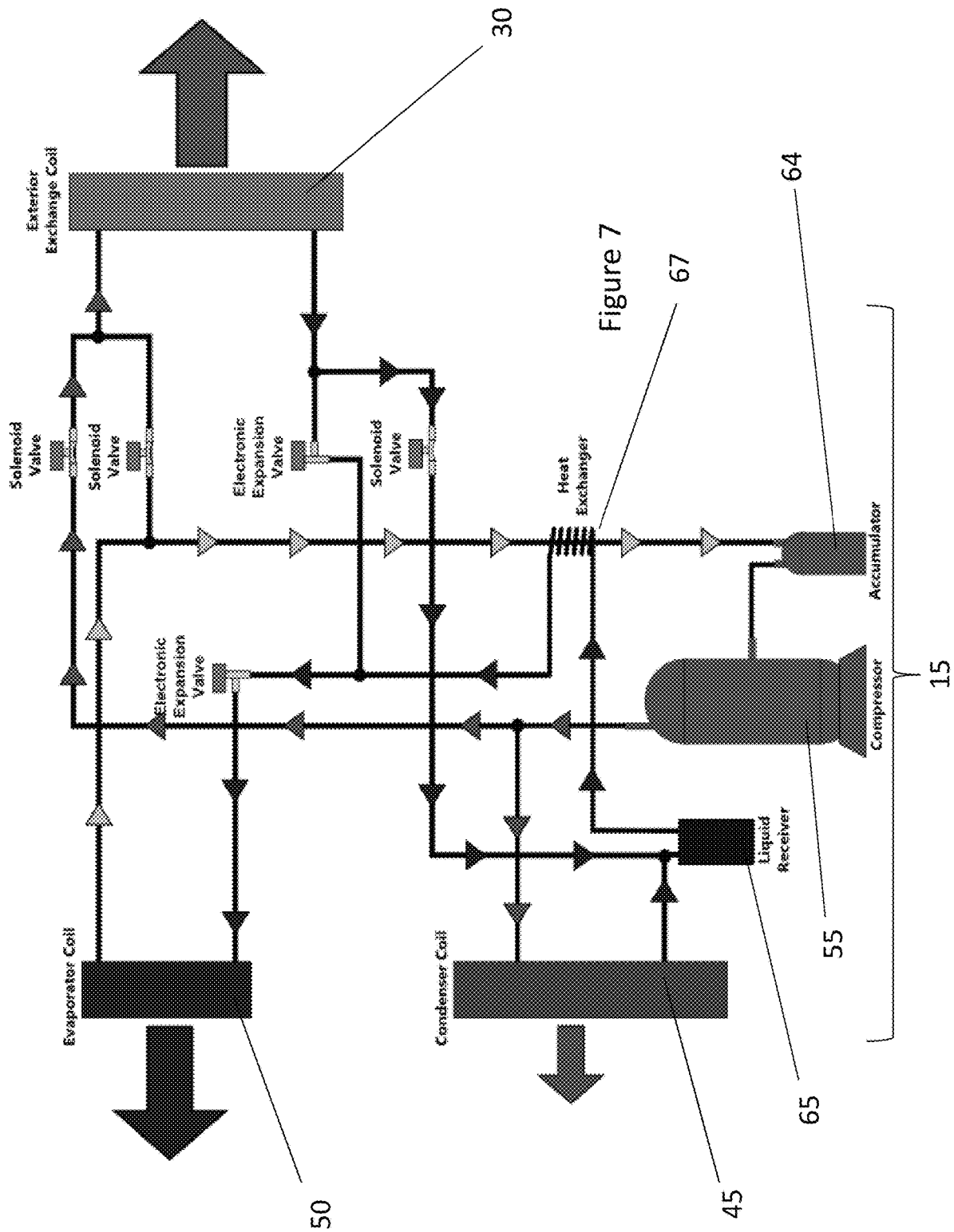
FIG. 7 is a third circuit diagram of the refrigeration cycle between a central unit and an exterior exchange coil of an air distribution system when there is additional demand for cold air according to an embodiment of the present disclosure.

With specific reference to FIG. 7 and according to one embodiment of the present disclosure, the circuit diagram for the central unit 15 in connection to the exterior exchange coil 30 is shown. Specifically, this circuit represents a flow of air whereby there is a simultaneous flow of hot and cold air; however, the rooms demand more cooling than heating. In contrast to the circuit diagram shown in FIG. 6, here the evaporator coil 50 will require additional cooled liquid refrigerant to be converted into cooled gas refrigerant such that the air flowing through said evaporator coil 50 is cooled. As excess cooled gas refrigerant flows into the accumulator 64 and compressor 55, said compressor redirects some of the excess warm gas refrigerant through to the exterior exchange coil 30. Air flowing from outdoors and through the exterior exchange coil 30 gains energy and is warmed, thereby cooling the refrigerant expelled from the exterior exchange coil 30 into cooler liquid refrigerant. This cooler liquid refrigerant travels into the liquid receiver 65 whereby the cycle as described above will occur again.

Figure 8:
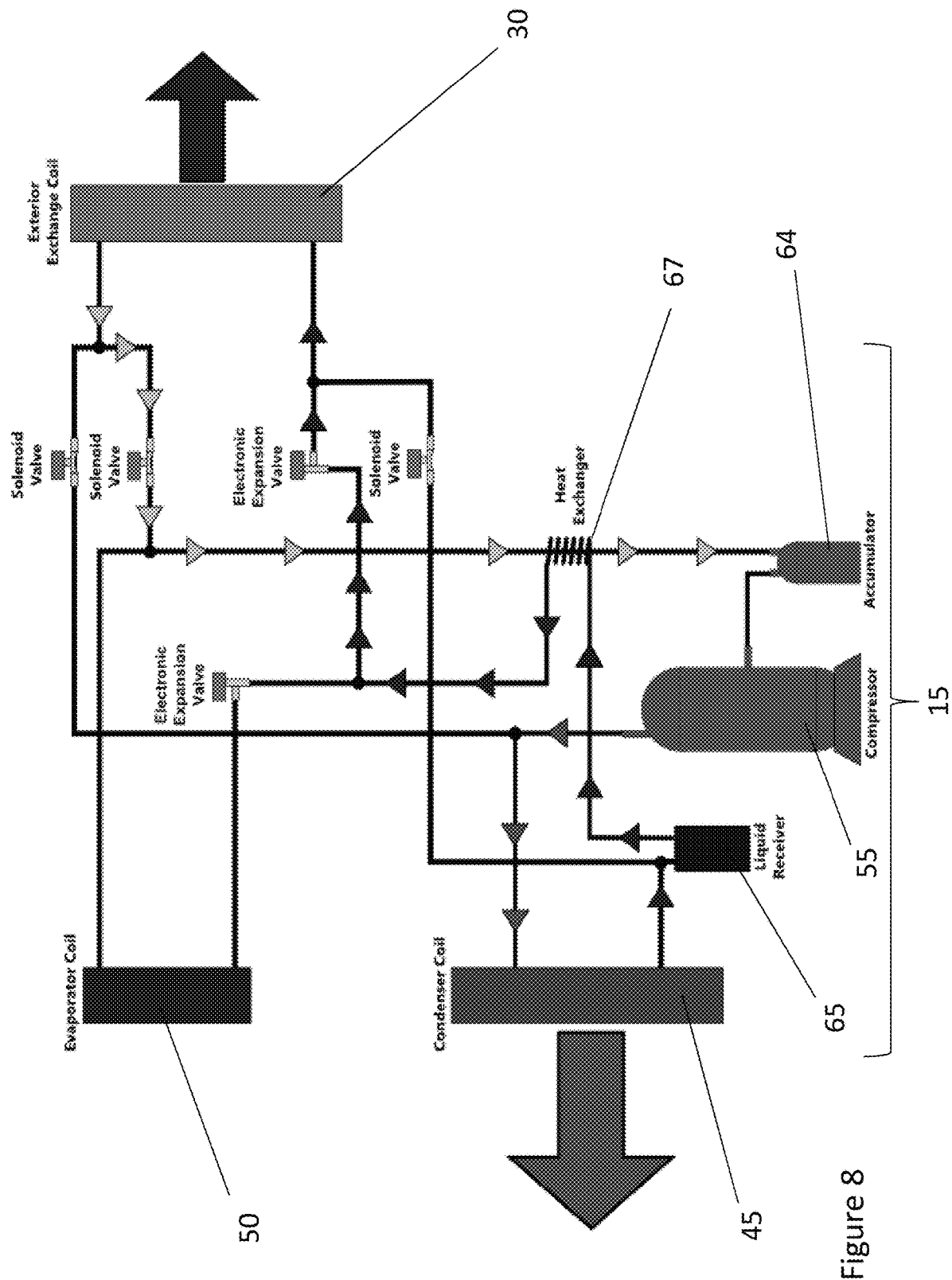
FIG. 8 is a fourth circuit diagram of the refrigeration cycle between a central unit and an exterior exchange coil of an air distribution system when there is only a demand for hot air according to an embodiment of the present disclosure.

With specific reference to FIG. 8 and according to one embodiment of the present disclosure, the circuit diagram for the central unit 15 in connection to the exterior exchange coil 30 is shown. Specifically, this circuit represents a flow of air whereby there is only a demand for hot air, such that the evaporator coil 50 is not used at all. Therefore, as cooler liquid refrigerant flows out of the condenser coil 45 and into the liquid receiver 65, said liquid receiver 65 directs all of the cool liquid refrigerant into the exterior exchange coil 30. The cool liquid refrigerant loses energy and air flowing through the exterior exchange coil 30 is cooled and expelled outdoors as cold air. The gas refrigerant exiting the exterior exchange coil 30 is in the form of a cool gas which flows back into the accumulator 64 and compressor 55 such that the cycle begins again.

Figure 9:
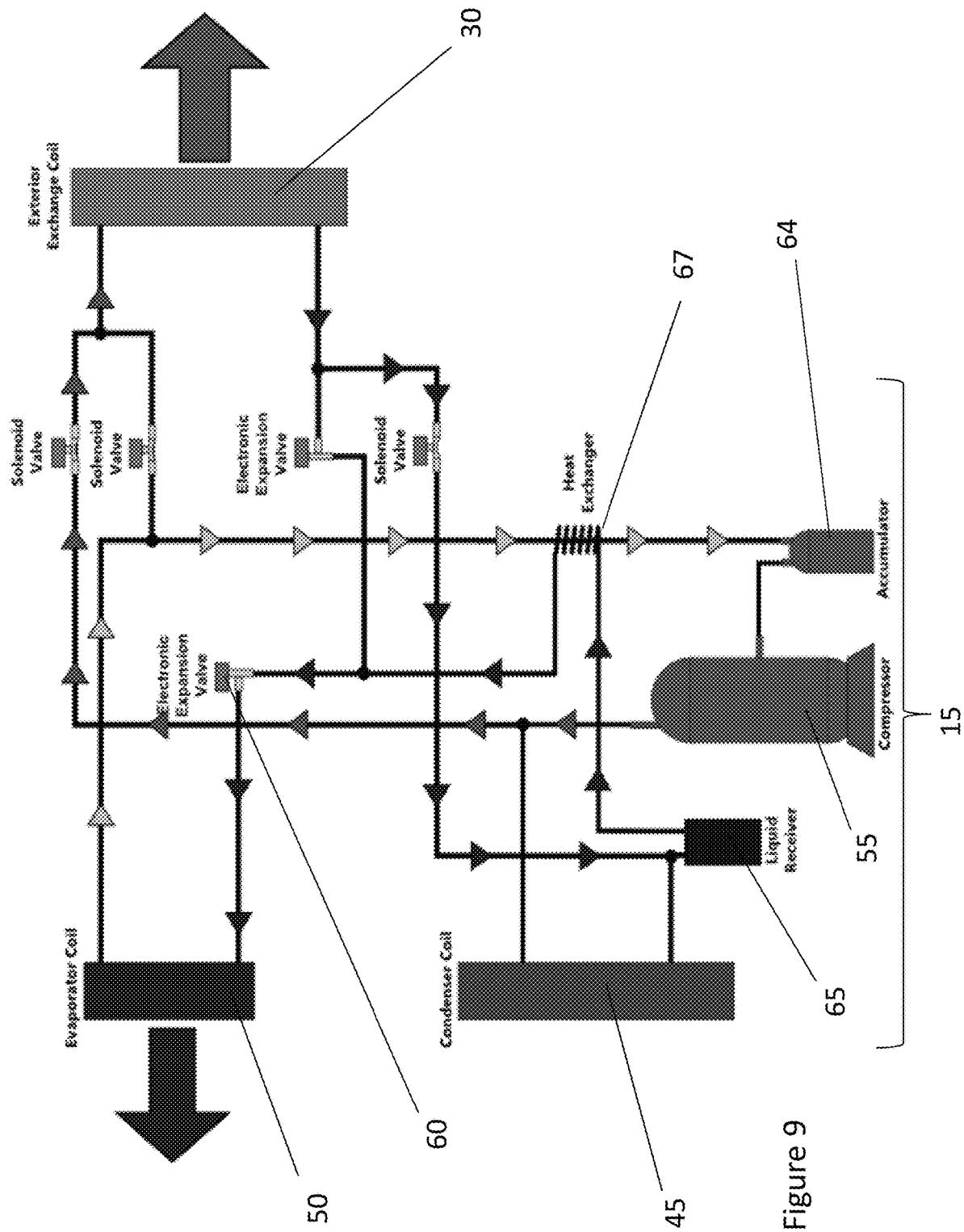
FIG. 9 is a fifth circuit diagram of the refrigeration cycle between a central unit and an exterior exchange coil of an air distribution system when there is only a demand for cool air according to an embodiment of the present disclosure.

With specific reference to FIG. 9 and according to one embodiment of the present disclosure, the circuit diagram for the central unit 15 in connection to the exterior exchange coil 30 is shown. Specifically, this circuit represents a flow of air whereby there is only a demand for cold air, such that the condenser coil 45 is not used at all. Therefore, as cold gas refrigerant flows out of the evaporator coil 50 and into the accumulator 64 and compressor 55, said compressor 55 directs the entire warm gas refrigerant into the exterior exchange coil 30. The warm gas refrigerant loses energy and air flowing through the exterior exchange coil 30 is warmed and expelled outdoors as hot air. The refrigerant exiting the exterior exchange coil 30 is in the form of a cooler liquid which flows back into the liquid receiver 65 and back to the expansion valve 60 and evaporator coil 50 such that the cycle begins again.

Figure 10:
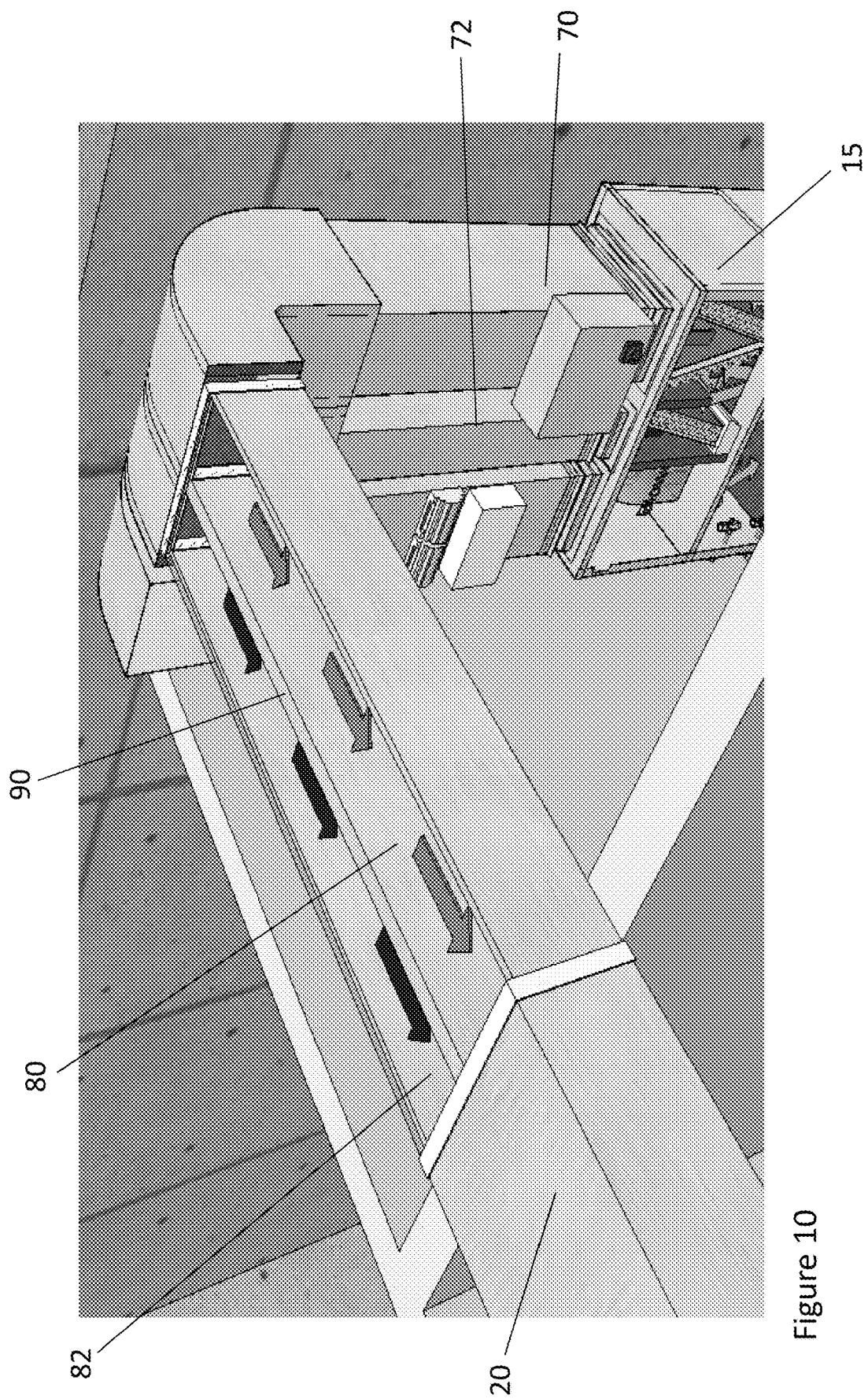
FIG. 10 is a perspective, partially cross-sectioned view of a ventilation system of an air distribution system according to an embodiment of the present disclosure.

With reference to FIG. 10 and according to a first embodiment of the present disclosure, the ventilation system 20 is shown, serving as a link between the control system (not shown) and the central unit 15. The ventilation system 20 is comprised of a first and second compartment 80, 82 which house the warm and cold sources of air as received from the first and second vents 70, 72, respectively. First and second compartments 80, 82 are separated by an insulator wall 90, which remains present throughout the ventilation system in order to constantly separate and thermally insulate the flow of warm and cold air. Indeed, it is of paramount importance that the respective flows of warm and cool air are not mixed in order to provide for greater efficiency, and the insulator wall 90 located between first and second compartments 80, 82 will reduce the heat exchange.

Figure 11:
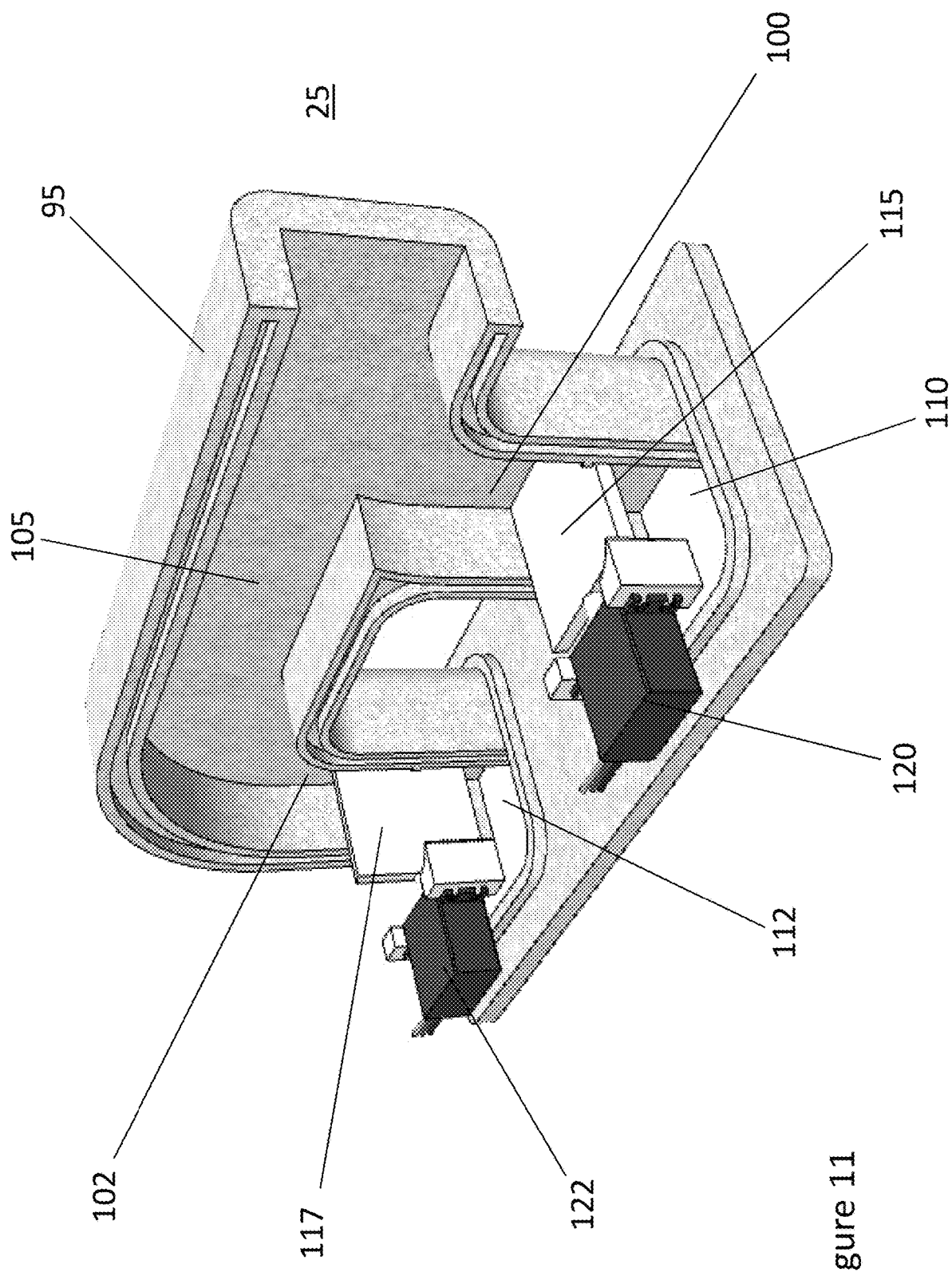
FIG. 11 is a perspective, partially cross-sectioned view of a control system of an air distribution system according to an embodiment of the present disclosure.

With reference to FIG. 11 and according to a first embodiment of the present disclosure, a control system 25 is generally comprised of a housing 95 designed to direct the flow of air from the ventilation system (not shown) through to a distribution vent (not shown). Specifically, the control system 25 has a first intake passage 100 and a second intake passage 102, each of which connecting into a main passage 105. The first intake passage 100 has a first aperture 110 in order to connect to either the first or second compartments (not shown) while the second intake passage 102 has a second aperture 112 that will connect to either the second or first compartments (not shown). It is to be understood that the first and second intake passages 100, 102 could connect to either of the first or second compartments (not shown) simply by changing the orientation of the control system 25. The purpose of the first and second intake passages 100, 102 is that they receive either a solely cold flow of air or solely a warm flow of air to be eventually distributed through to the main passage 105 and out the distribution vent (not shown). First and second slats, 115, 117 are positioned within the first and second intake passages 100, 102 respectively, and serve to block or allow the flow of either warm or cold air that would normally flow through said first and second intake passages 100, 102. Indeed, first and second electrical actuator 120, 122 are connected to the first and second slats 115, 117 respectively, in order to determine which of the first and second intake passages 100, 102 will be open or closed in operation. The first and second electrical actuator 120, 122 are electrically connected to the air distribution unit (not shown) and temperature sensors will serve to dictate the quantity of warm or cold air to flow into a room. In another embodiment, the first and second intake passages 100, 102 will function binarily, which is to say that they will be either actuated to be in a completely open or completely closed position.

Figure 12:
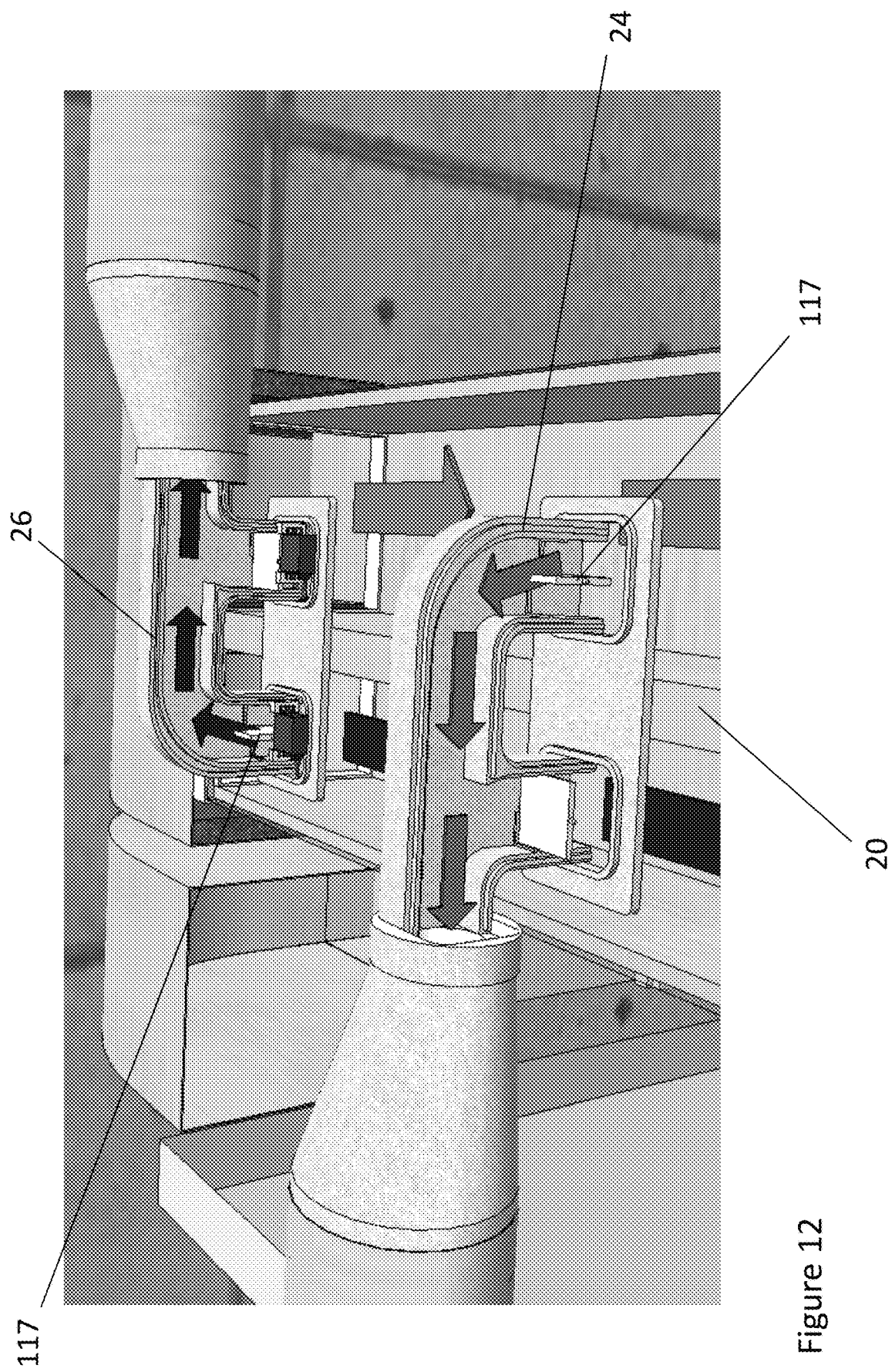
FIG. 12 is a perspective, partially cross-sectioned view of a control system connected to a ventilation system of an air distribution system according to an embodiment of the present disclosure.

With reference to FIG. 12 and according to a first embodiment of the present disclosure, first and second control system 24, 26 are shown fastened to the ventilation system 20. A worker skilled in the art would appreciate that the control systems 24, 26 are identical to control system 25, and are only identified differently in FIG. 10 for clarity. It is further noted that the second control system 26 is oriented in the opposite direction on the ventilation system 20 than the first control system 24. In both first and second control systems 24, 26, the second slat 117 is in a completely open position; in other words, said second slat 117 is in a vertical position, relative to the ventilation system 20. As the second slat 117 for the first control system 24 is aligned with the warm air flowing through the first compartment 80, said second slat 117 allows for only warm air to flow through the first control system 24. Meanwhile, as the second slat 117 for the second control system 26 is aligned with the cool air flowing through the second compartment 82, said second slat 117 allows for only cool air to flow through the second control system 26.

Figure 13:
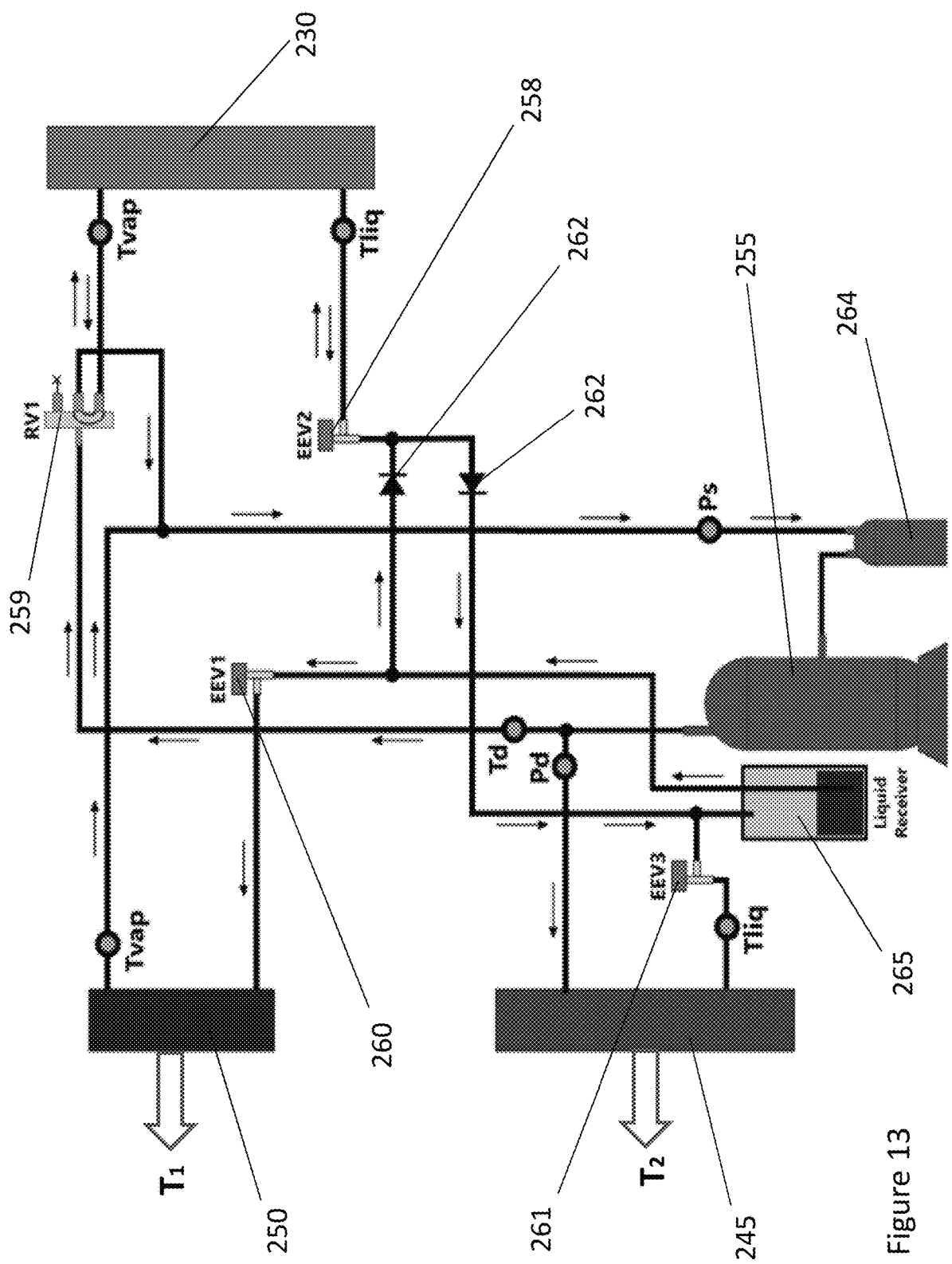
FIG. 13 is a circuit diagram of the refrigeration cycle between a central unit and an exterior exchange coil of an air distribution system when there is a demand for both heat and cool air, according to another embodiment of the present disclosure.

With reference to FIG. 13 and according to another embodiment of the present disclosure, the circuit diagram provided in FIGS. 5-9 has been reproduced in a single modified diagram without the air flow demands. The previous solenoid valves (59 in FIG. 5) have been replaced with a reversible valve 259 while the electronic expansion and solenoid valve (58 and 62 in FIG. 5, respectively) have been replaced with a second electronic expansion valve 258. The first expansion valve 260 is still provided, and a third electronic expansion valve 261 has been provided, positioned between the liquid receiver 265 and the condenser coil 265. Two-way arrows leading to and from the exterior exchange coil 230 represent the reversible flow of air during demands of simultaneous heating and cooling.

Figure 14:
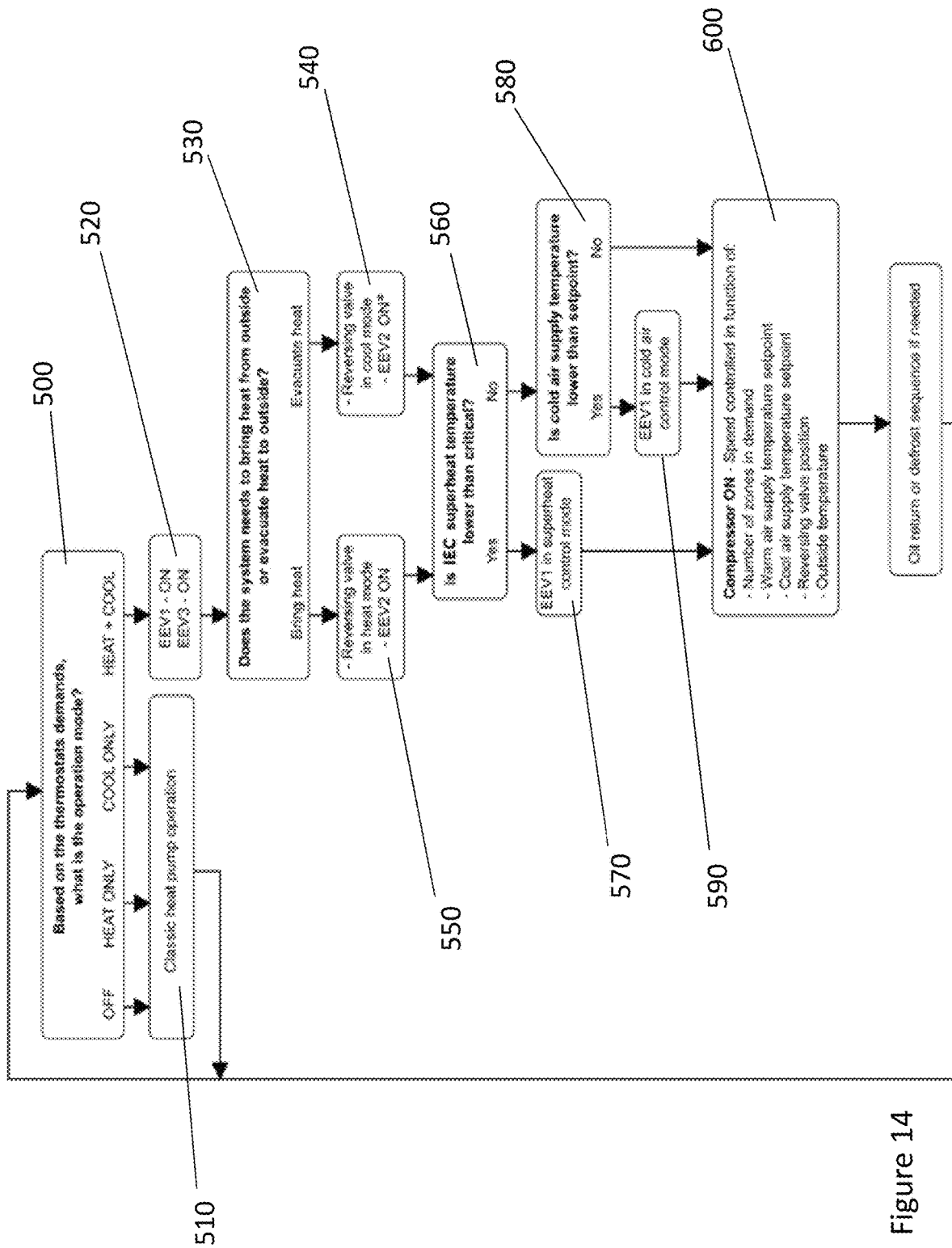
FIG. 14 is an algorithm depicting the method of operation of the air distribution system, according to another embodiment of the present disclosure.

With reference to FIGS. 13 and 14 and according to another embodiment of the present disclosure, the method of operation of the air distribution unit is shown, generally comprised of the first step 500 consisting of an analysis of the thermostat demands within the dwelling to determine the mode of operation. If the system has no demand, or is demanding on heating or cooling independently one from the other, the second step 510 will be for the unit to operate under circumstances known in the art and loop back to the first step 500. In a fourth circumstance which is pivotal to the present disclosure, the internal dwelling thermostat demand is both cooling and heating simultaneously. In other words, a first room requires substantial heating while a second room is too warm and requires a cooler temperature. In such a case, the unit operates in a simultaneous cooling and heating operation such that the third step 520 is turn both the first and third electronic expansion valves 260, 261 on. In doing so, the third electronic expansion valve will allow cold liquid exiting the condenser coil 245 to flow through a liquid receiver 265, and through to the first electronic expansion valve 260, which in turns allows the cold liquid to flow into the evaporator coil 250. When both the first and third valves 260, 261 are open, the condenser coil 245 is heating while the evaporator coil 250 is cooling. Once the first and third valves 260, 261 are open, the fourth step 530 is to determine if the unit needs to bring heat from the outside or evacuate heat to the outside by means of the exterior exchange coil 230. In other words, the unit will calculate an aggregate temperature of the dwelling and determine if there is a demand for more heating than cooling, or more cooling than heating. If more cooling is required, heat is evacuated from the system in the fifth step 540, while if more heating is required, heating is brought into the system in the sixth step 550. In the fifth step 540, the reversible valve 259 is in cooling mode and the second electronic expansion valve 258 is on but in a specialized operating mode schematically represented by "ON*". Indeed, the second valve 258 is throttled up or down in order to control the amount of hot gas refrigerant flowing through the inside unit condenser coil 245. In this operating mode of the second valve 258, the second valve 258 will modulate towards a closed position if the temperature T2 of the condenser coil 245 is lower than the predetermined user setpoint and modulate toward a fully open position if the temperature T2 is higher than said setpoint. The circuit diagram of the demand where more cooling is required such that heat is evacuated and the unit goes to the fifth step 540 is analogous to the circuit diagram found in FIG. 7. In other words, the reversible valve 259 is in cool mode, which is to say that it allows hot gas originating from the compressor 255 to exit the dwelling through the exterior exchange coil 230. The second valve 258 is in its specialized operating mode and thusly throttled as described above. However, a worker skilled in the art would appreciate that two diodes 262 are present in this embodiment acting as a check valve and allowing the hot gas refrigerant travelling through the exterior exchange coil 230 and being thus transformed into cold gas as hot air exits the dwelling, to make its way into the accumulator 264 and ultimately back into the system through the compressor 255. Meanwhile, the circuit diagram of the demand where more heating is required such that cold air is expelled from the exterior exchange coil 230 is analogous to the circuit diagram found in FIG. 6. In it, the reversible valve 259 is in heat mode, which it to say that it allows for cold gas refrigerant coming from the exterior exchange coil 230 to travel to the accumulator 264. On the other hand, the second valve 258 is on, such that the refrigerant in its cold liquid form can travel through said second valve 258, into the exterior exchange coil 230 and out as cold gas. Following either of the fifth or sixth steps 540, 550, is the seventh step 560 where the system will determine if the superheat temperature of the evaporator coil 250 taken at "Tvap" is below critical. In this instance, the term "below critical" is used to describe the temperature of the refrigerant circulating at Tvap that would be close to being in a liquid state. If the refrigerant is below this critical level and thus has not been converted into cold gas, the first valve 260 goes into superheating control mode in the eighth step 570 as it is critical that the refrigerant going back into the compressor is not in any form but gaseous. In superheating control mode, the first valve 260 throttles itself so as to only allow the appropriate amount of liquid to go through to the evaporator 250 in order to meet the superheat setpoint. Indeed, a worker skilled in the art would appreciate that in a mode where the heating demands are higher than that of the cooling demands, operating in superheat control mode will bring the evaporator coil 250 outlet air temperature lower than the T1 setpoint, as an abundance of liquid refrigerant for the required cooling demands will make its way to the first valve 260, such that the first valve 260 must necessarily be throttled to ensure that only superheat critical setpoint is followed. In the alternative and the refrigerant is not below the aforementioned critical level, the system goes to the ninth step 580 and checks whether the outgoing cold air temperature designated as T1 is lower than the setpoint temperature. If so, the tenth step 590 is for the first valve 260 to go into cold air control mode, which is to say that once again the first valve 260 will throttle the amount of cold liquid refrigerant going through to the evaporator coil 250. Finally in any circumstance after the eighth, ninth or tenth steps 570, 580, 590, the eleventh step 600 is to activate the compressor 255.

Figure 15:
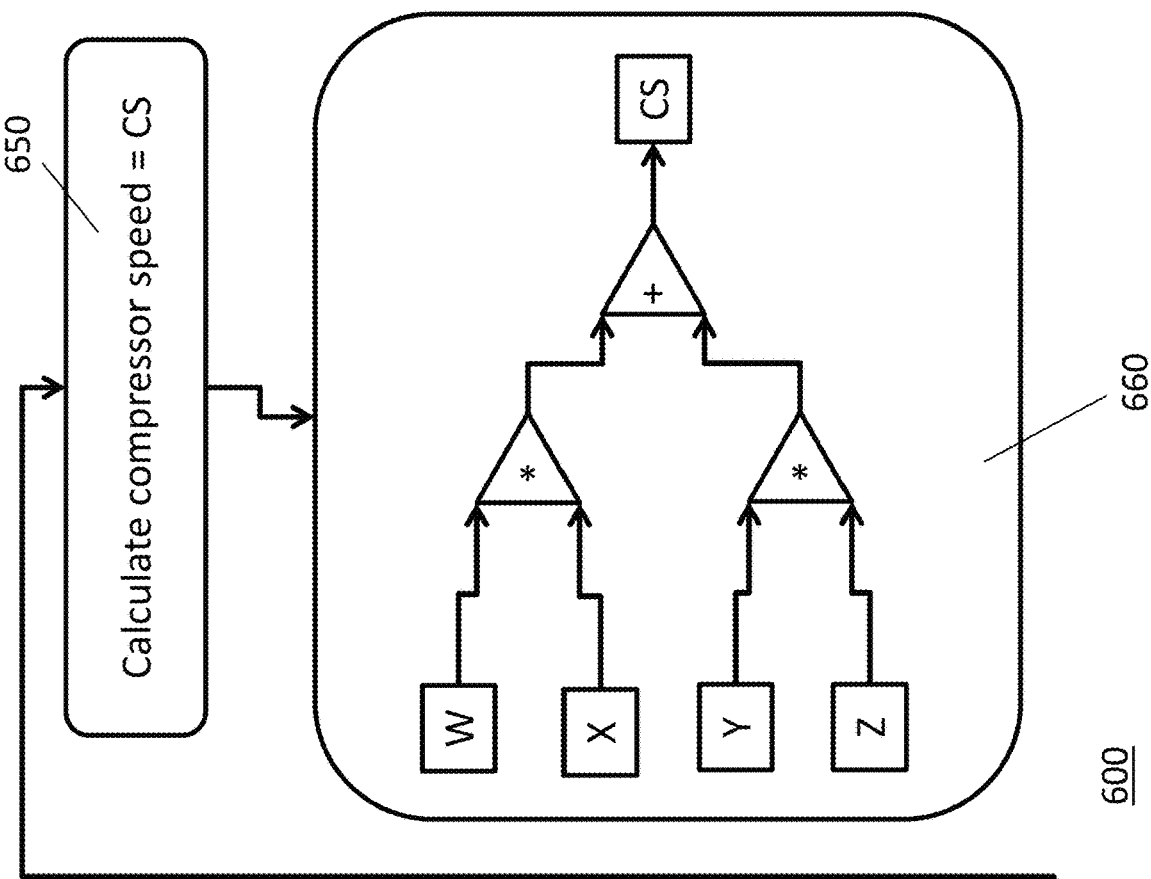
FIG. 15 is an algorithm depicting the method of operation of the compressor of the air distribution system, according to another embodiment of the present disclosure.
Figure 15:
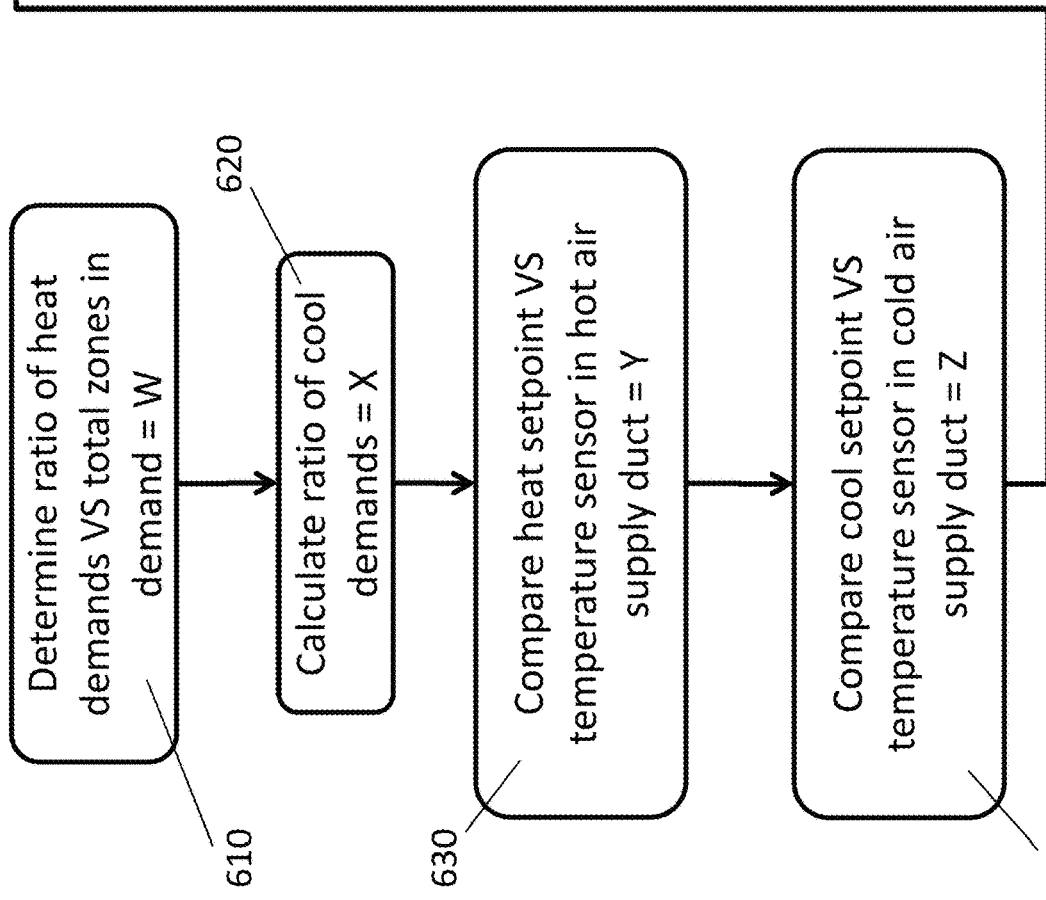

With reference to FIGS. 13 and 15 and according to an embodiment of the present disclosure, a method to illustrate the functioning of the compressor 255 at the previously described eleventh step 600 is shown in greater detail. The first step 610 is to determine the number of zones in heat demands and compare this to the total zones in demand to determine a percentage "W". An effective way to achieve this is with the formula 100*(total number of zones demanding heat)/(total number of zones). The second step at 620 is to calculate the zones demanding cool termed "X", which is necessarily derived using the formula (100−W)=X. The compressor 255 will then at the third step 630 compare the actual heat setpoint as determined by the user, and compare this value to the temperature sensor positioned in the hot air supply duct at T2. If the temperature at the sensor is lower that the setpoint, the compressor 255 will increase its speed. Conversely, if the temperature at the sensor is higher than the setpoint, the speed of the compressor will decrease. This new speed of the compressor is given value "Y". The fourth step 640 represents the same calculation but for the cool setpoint to determine a compressor 255 speed termed "Z". In other words, if the cool setpoint is lower than the temperature sensor in the cold air supply duct at T1, the compressor 255 must increase its speed, and decrease for the opposite. The fifth step 650 is to calculate the new compressor speed based on the variables W, X, Y and Z. As is show, the new speed of the compressor 255 will be ((W*X)+(Y*Z))=CS.

Figure 16:
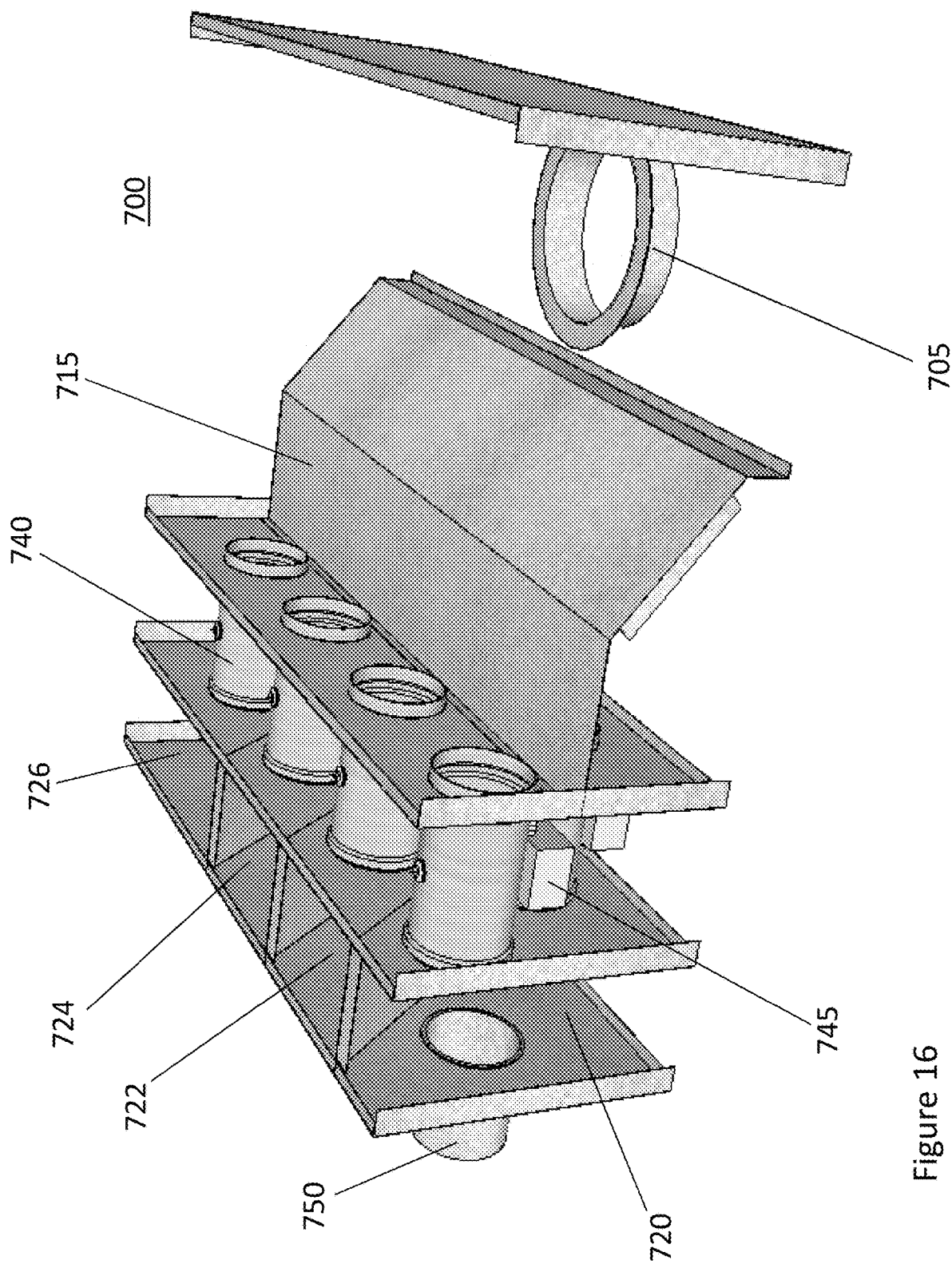
FIG. 16 is an upper perspective view of a duct manifold of an air distribution system according to another embodiment of the present disclosure.
Figure 17:
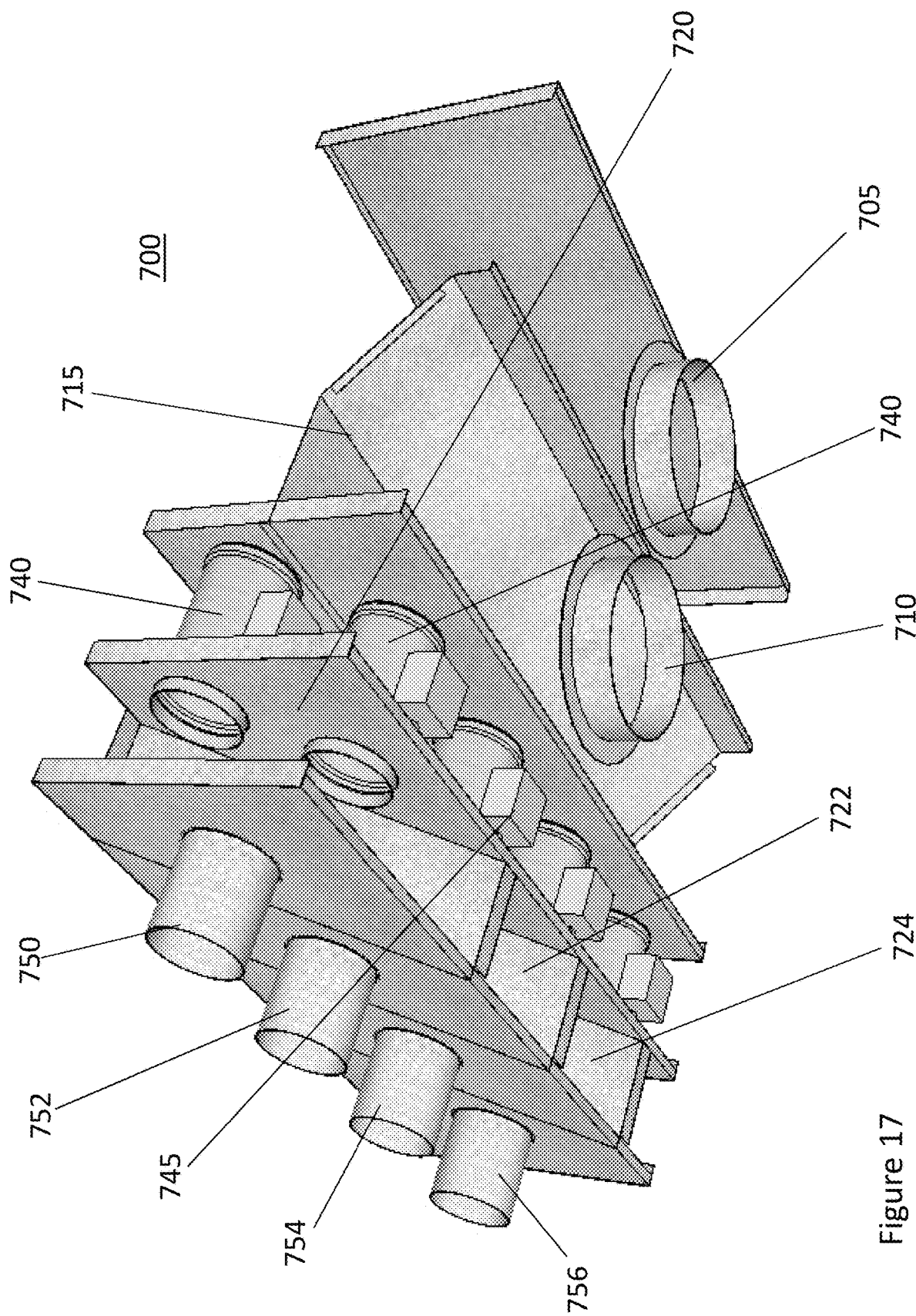
FIG. 17 is a lower perspective view of a duct manifold of an air distribution system according to another embodiment of the present disclosure; and, FIG. 18 is a perspective view of a duct manifold connected to a central unit of an air distribution system, according to another embodiment of the present disclosure.

With reference to FIGS. 16 and 17 and according to an embodiment of the present disclosure, a duct manifold 700 is shown without a housing to illustrate the inner workings. The manifold 700 is comprised of a hot and cold inlet port 705, 710 which enter the manifold and are separated into two distinct chambers by means of a separator 715. Both hot and cold air supplies entering the manifold 700 are then each separated into a first, second, third and fourth zones 720, 722, 724, 726 by means of four pairs of bridging members 740, each pair of bridging members 740 corresponding to one zone. A worker skilled in the art would appreciate that while there are only four zones 720, 722, 724, 726 and four corresponding pairs of bridging members 745 shown in the present embodiment, many other zones would be possible to distribute the heat in the dwelling. Each bridging member 740 is further comprised of a control system which is further comprised of a controller 745 to actuate a corresponding shutter (not shown) positioned within the bridging members 740. The shutters (not shown) can swivel in order to achieve open, closed, partially open or other positions to restrain the flow of hot or cold air flowing into the respective zones. Resulting hot or cold air into the first, second, third or fourth zones 720, 722, 724, 726 flows from said zones into corresponding first, second, third and fourth outlet ports 750, 752, 754, 756 and into a room of the dwelling. In doing so, each room is able to receive the appropriate amount of heating and cooling as a result of a single source of air flowing out of each condenser and evaporator coils (not shown) based on the various user setpoints in each room.

Figure 18:
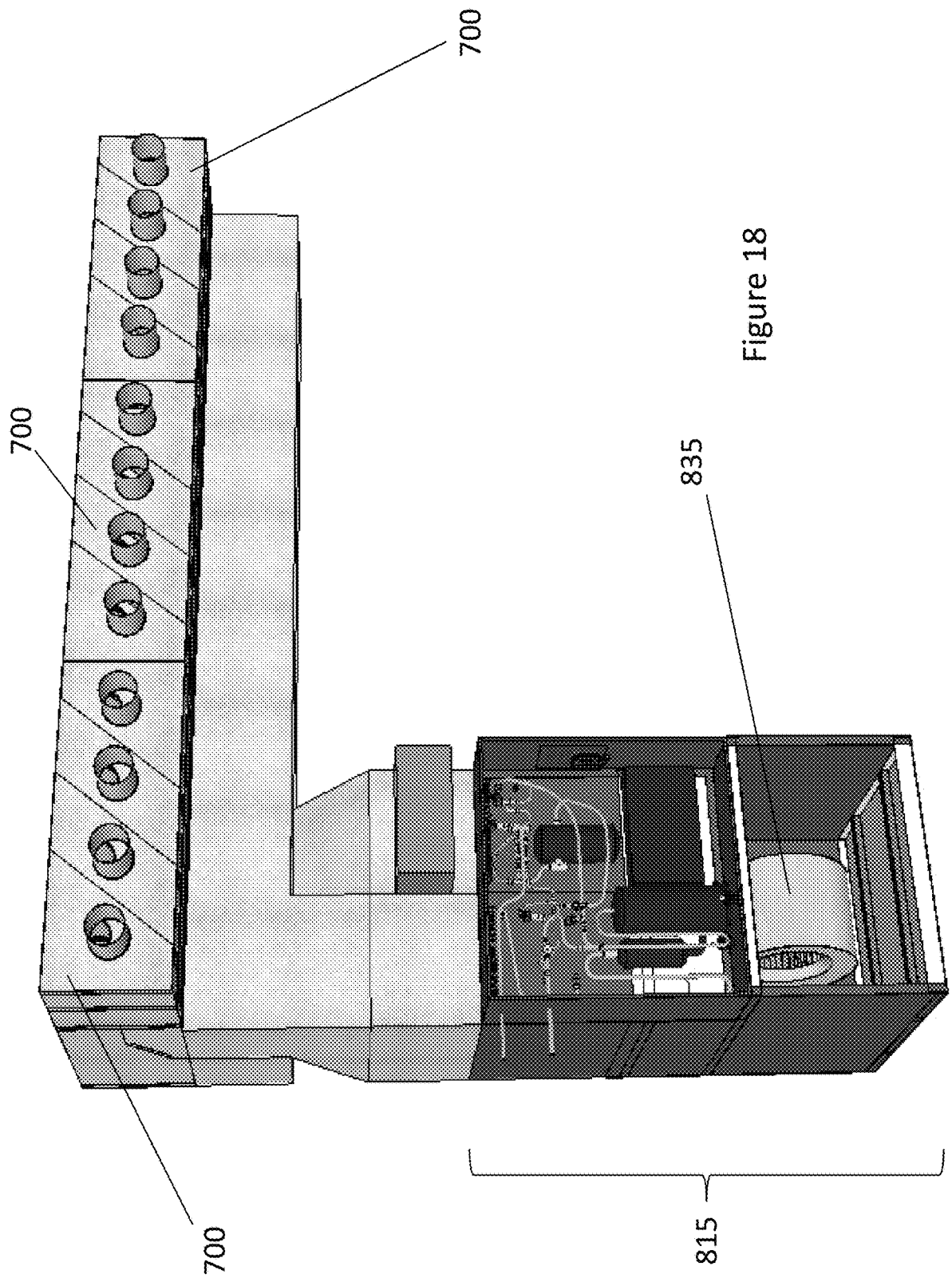

With reference to FIG. 18 and according to an embodiment of the present disclosure, three sets of manifolds 700 are shown connected to a central unit 815. As was similarly shown in FIG. 3, the central unit 815 is primarily responsible for providing a source or flow of simultaneously hot and cold air through a building by means of the manifolds 700 positioned thereon. In this embodiment, the three manifolds 700 are positioned above the central unit 815 in order to redistribute the hot and cold air as aforementioned throughout the various rooms in the dwelling. The blower 835 shown therein will take fresh air from outside the dwelling and expel it through the condenser and evaporator coils (not shown) for redistribution inside the dwelling. A worker skilled in the art would appreciate that the central unit 815 shown herein would function very similarly to the one described above.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. An air distribution system comprising:
a ventilation conduit system positioned within a dwelling;
a central unit connected to the ventilation conduit system to receive stale air from the dwelling and expel hot and cold air separately to the ventilation conduit system, the central unit further comprised of:
at least one condenser coil to receive and convert the stale air into the hot air; and,
at least one evaporator coil to receive and convert the stale air into the cold air;
an exterior exchange coil operatively engaged to the central unit to provide additional cooling and additional heating to the dwelling, the exterior exchange coil configured to receive an excess of a refrigerant from one of: the at least condenser coil and the at least one evaporator coil; and,
a control system engaged to the ventilation conduit system to control an airflow of the hot and cold air and to simultaneously combine and expel the airflow of the hot air and the cold air into specific rooms of the dwelling;
wherein the ventilation conduit system receives the hot air isolated from the cold air and carries the hot and cold air throughout the dwelling.

2. The air distribution system of claim 1 wherein the control system is further comprised of shutters to control the flow of air from the ventilation conduit system into the specific rooms of the dwelling.

3. The air distribution system of claim 1 further comprised of first, second and third electronic expansion valves and a reversible valve to direct the flow of the refrigerant.

4. The air distribution system of claim 1 further comprised of first, second and third solenoid valves and first and second electronic expansion valves to direct the flow of the refrigerant.

5. The air distribution system of claim 1 wherein the central unit is further comprised of a blower to suck the stale air from the dwelling and cycle the stale air towards the at least one condenser coil and the at least one evaporator coil.

6. The air distribution system of claim 1 wherein the central unit is further comprised of a compressor to compress the refrigerant.

7. The air distribution system of claim 1 further comprised of at least one thermostat to set at least one temperature in at least one room of the dwelling.

8. The air distribution system of claim 1 wherein the central unit is further comprised of an accumulator and a liquid receiver.

* * * * *